(12) United States Patent
Beeles et al.

(10) Patent No.: US 8,011,076 B2
(45) Date of Patent: Sep. 6, 2011

(54) SWAGE COLLAR WITH INTERNAL SEALING INSERT

(75) Inventors: Edward E. Beeles, Hermosa Beach, CA (US); David Hocking, Signal Hill, CA (US); Julie R. Jones, Bethalto, IL (US); Stuart R. Seley, Kirkwood, MO (US); John E. Inman, Frontenac, MO (US)

(73) Assignee: Hi-Shear Corporation, Torrance, CA (US)

( * ) Notice: Subject to any disclaimer, the term of this patent is extended or adjusted under 35 U.S.C. 154(b) by 171 days.

(21) Appl. No.: 12/551,738

(22) Filed: Sep. 1, 2009

(65) Prior Publication Data

US 2009/0320259 A1     Dec. 31, 2009

Related U.S. Application Data

(62) Division of application No. 10/031,184, filed as application No. PCT/US01/19983 on Jun. 22, 2001, now Pat. No. 7,597,517.

(60) Provisional application No. 60/213,769, filed on Jun. 23, 2000.

(51) Int. Cl.
    *B23P 11/00*     (2006.01)
(52) U.S. Cl. ............. 29/243.529; 29/243.522; 29/283.5; 29/254
(58) Field of Classification Search ............. 29/243.522, 29/243.529, 428, 469.5, 505, 521, 525.01; 411/361, 371.1, 369, 533
    See application file for complete search history.

(56) References Cited

U.S. PATENT DOCUMENTS 3,066,568 A * 12/1962 Armour .................. 411/361
3,094,017 A *  6/1963 Siebol et al. .............. 29/506
(Continued)

FOREIGN PATENT DOCUMENTS

GB           2119467 A      11/1983

OTHER PUBLICATIONS

WIPO, International Search Report, PCT/US01/19983, mail date Nov. 12, 2001.

*Primary Examiner* — Lee D Wilson
*Assistant Examiner* — Jamal Daniel
(74) *Attorney, Agent, or Firm* — Henricks, Slavin & Holmes LLP

(57) ABSTRACT

A swage collar and an internal sealing insert form a swage collar assembly used in combination with a structural fastener to prevent leakage through a connection of workpieces fastened together by the structural fastener. The swage collar has a hollow, generally cylindrical main body portion with a main central bore, and a base portion with an internal shoulder formed in the main central bore so as to form a seal receiving guide. The shaft of the fastener typically includes a threaded section and an unthreaded section, and the internal sealing insert interfaces with the threaded section and the unthreaded section of the shaft of the pin. In an alternate embodiment, the internal sealing insert interfaces with the unthreaded section of shaft of the pin. The swage collar assembly is fitted over the fastener, a swaging tool is fitted over the swage collar assembly, and the swaging tool is forced over the swage collar assembly with sufficient force to cause plastic deformation in the swaging collar to force the swaging collar and internal sealing insert into engagement with the shaft of the fastener.

4 Claims, 8 Drawing Sheets

U.S. PATENT DOCUMENTS

| | | | |
|---|---|---|---|
| 3,139,786 A | 7/1964 | Ardell | |
| 3,339,003 A | 8/1967 | Cessna | |
| 3,399,589 A | 9/1968 | Breed | |
| 3,425,259 A * | 2/1969 | Baugh | 29/243.522 |
| 3,464,306 A * | 9/1969 | Orloff et al. | 411/361 |
| 3,464,472 A * | 9/1969 | Reynolds | 411/336 |
| 3,550,498 A | 12/1970 | Briles | |
| 3,622,167 A | 11/1971 | Velthoven | |
| 3,635,272 A | 1/1972 | Scheffer | |
| 3,695,086 A * | 10/1972 | Savage | 29/243.522 |
| 3,742,808 A | 7/1973 | Trembley | |
| 4,069,575 A * | 1/1978 | Sigmund | 29/446 |
| 4,112,811 A | 9/1978 | King | |
| 4,347,728 A * | 9/1982 | Smith | 29/243.529 |
| 4,367,060 A | 1/1983 | Berecz | |
| 4,768,910 A | 9/1988 | Rath | |
| 4,813,834 A * | 3/1989 | Smith | 411/337 |
| 4,867,625 A * | 9/1989 | Dixon | 411/361 |
| 4,979,279 A * | 12/1990 | Garvey | 29/252 |
| 5,090,852 A * | 2/1992 | Dixon | 411/361 |
| 5,145,300 A * | 9/1992 | Wallace | 411/1 |
| 5,208,958 A * | 5/1993 | Wilcox | 29/252 |
| 5,454,675 A | 10/1995 | DeHaitre | |
| 5,562,379 A | 10/1996 | Rausch et al. | |
| 6,182,345 B1 | 2/2001 | Travis | |
| 6,233,802 B1 * | 5/2001 | Fulbright | 29/243.519 |
| 6,283,691 B1 | 9/2001 | Bogatz | |
| 6,389,676 B1 * | 5/2002 | Denham | 29/525.06 |
| 6,497,024 B2 * | 12/2002 | Fulbright | 29/243.522 |
| 6,748,642 B2 * | 6/2004 | Tsegga et al. | 29/469.5 |
| 7,195,438 B2 * | 3/2007 | Harbin et al. | 411/361 |
| 7,465,234 B2 * | 12/2008 | Keener et al. | 470/6 |
| 7,597,517 B2 * | 10/2009 | Beeles et al. | 411/361 |
| 7,654,909 B2 * | 2/2010 | Keener et al. | 470/5 |
| 2001/0029651 A1* | 10/2001 | Fulbright | 29/243.522 |
| 2002/0157226 A1* | 10/2002 | Hagedorn et al. | 29/243.522 |
| 2003/0115743 A1* | 6/2003 | Fulbright | 29/715 |
| 2003/0219327 A1* | 11/2003 | Beeles et al. | 411/361 |
| 2008/0184545 A1* | 8/2008 | Cobzaru et al. | 29/243.529 |
| 2009/0320259 A1* | 12/2009 | Beeles et al. | 29/283.5 |
| 2010/0257714 A1* | 10/2010 | Mercer et al. | 29/243.529 |

* cited by examiner

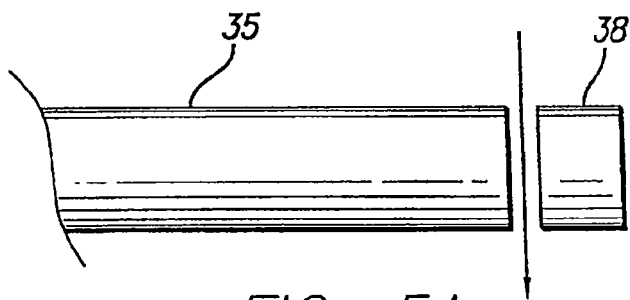
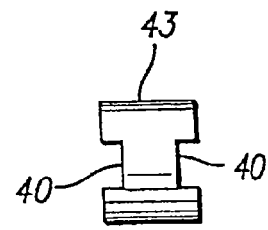
FIG. 5A                FIG. 5B
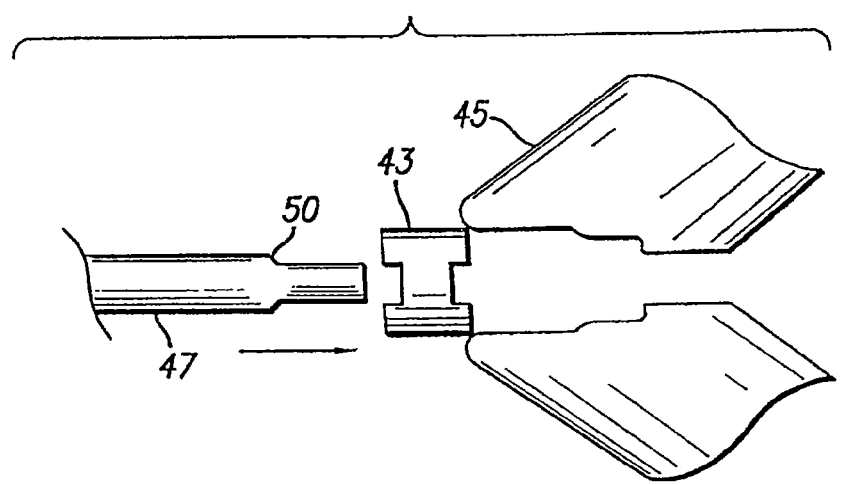
FIG. 5C

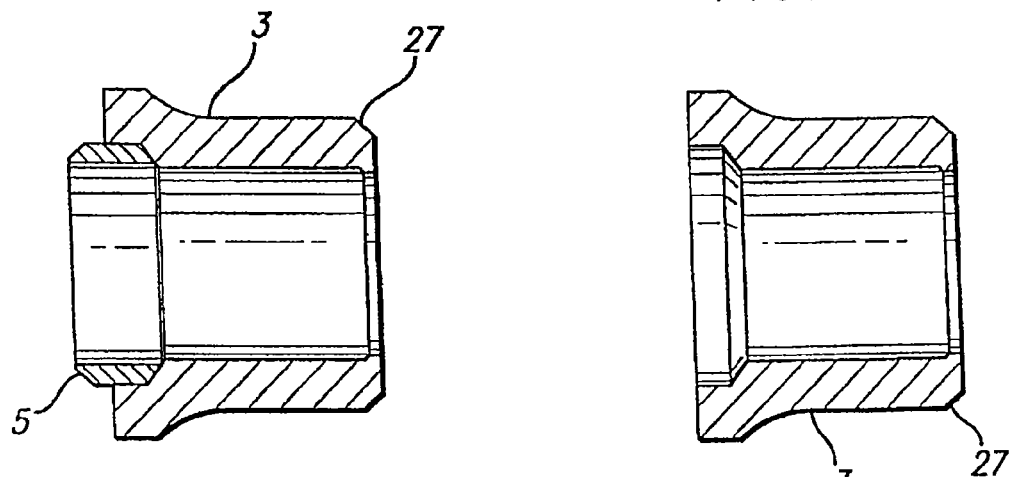
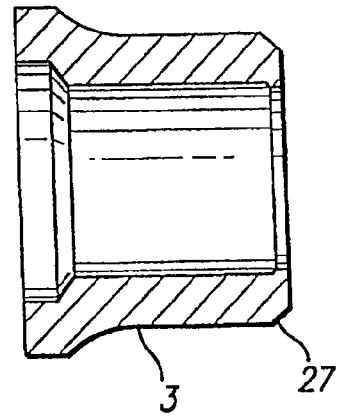
FIG. 6A
FIG. 6B
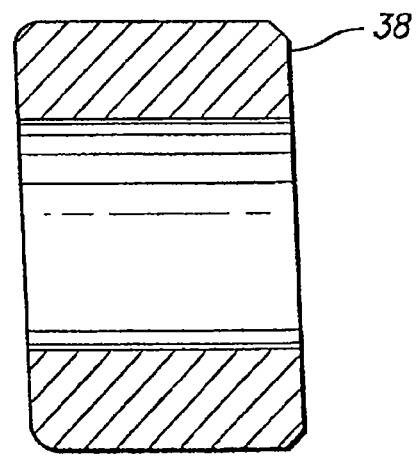
FIG. 6C

SWAGE COLLAR WITH INTERNAL SEALING INSERT

RELATED APPLICATIONS

This application is a division of application Ser. No. 10/031,184, filed Jan. 16, 2002, which is a national stage entry of International Application No. PCT/US01/19983, filed Jun. 22, 2001, which is based upon provisional application Ser. No. 60/213,769 filed Jun. 23, 2000.

BACKGROUND OF THE INVENTION

This invention relates generally to structural fasteners, and more particularly relates to a structural fastener having a swage collar and an internal seal to prevent leakage through a connection fastened by the structural fastener.

Structural fasteners of the type to which this invention is directed typically include a headed pin with locking grooves, and a generally cylindrical collar for the pin. The structural fastener is typically used to secure a composite assembly of workpieces, and the pin is placed in aligned apertures through the workpieces to be secured together, and the collar is placed over the locking grooves of the pin. The collar is then radially compressed into the locking grooves to affix the collar on the pin. A tool that is commonly used to compress the collar over the locking grooves of the pin is a swaging tool which pulls the pin in one direction and forces a swage anvil over the collar in the other direction to affix the collar to the pin and forcibly clinch the workpieces together. When such structural fasteners are used in applications such as the joining of parts to liquid containing tanks such as aircraft fuel tanks, it is desirable that leakage from such tanks not be allowed to occur around or through such fasteners. The present invention meets these and other needs.

SUMMARY OF THE INVENTION

Briefly, and in general terms, the present invention provides for a structural fastener having a swage collar and an internal sealing insert to prevent leakage through a connection fastened by the structural fastener. The invention accordingly provides for a swage collar apparatus for sealing a connection of a fastener through a composite assembly of workpieces to be secured together, and for preventing leakage through the connection. The fastener typically includes a shaft having an externally threaded or grooved section. In a presently preferred embodiment, the swage collar apparatus includes a swage collar adapted to be disposed over the threaded or grooved section of the fastener, and an internal sealing insert disposed in the swage collar over the fastener.

The swage collar preferably comprises a hollow, generally cylindrical collar, having a main body portion with a main central bore, and a base portion with an internal shoulder formed in the main central bore so as to form a seal receiving guide, the internal shoulder having a diameter that is larger than the diameter of the main central bore. In a preferred aspect, the base portion is flared outward, having an external diameter larger than the main central bore. The swage collar is preferably formed of a deformable material, which may be a deformable metal such as aluminum or titanium, for example. In a presently preferred embodiment, the internal sealing insert is made of tetrafluoroethylene.

In one presently preferred embodiment, the shaft includes an unthreaded section, and the internal sealing insert interfaces with the threaded section and the unthreaded section of the shaft of the pin. In an alternate embodiment, the internal sealing insert interfaces with the unthreaded section of shaft of the pin.

In another aspect, the invention also provides for a method of installing a sealing fastener, in which the swage collar and sealing insert form a swage collar assembly that is fitted over the fastener, and a swaging tool is fitted over the swage collar assembly. The swaging tool has a collar entrance aperture at one end with an inside diameter at an inside edge that is slightly larger than the outside diameter of the swaging collar at the outside edge of the swaging collar, so as to fit over the swaging collar. The swaging tool is forced over the swage collar assembly with sufficient force to cause plastic deformation in the swaging collar so that the material of the swaging collar is forced into engagement with the shaft of the fastener, and to bring the internal sealing element into sealing engagement with the shaft of the fastener to form a fluid impermeable seal to prevent leakage through a connection formed by the fastener through the composite assembly of workpieces.

In another aspect, the invention provides for a swage fastening system, including a pin having an enlarged head, a smooth neck, and a threaded body, a generally cylindrical collar, and a sealing ring. The collar preferably has a main central bore, and a base portion with an internal shoulder formed in the main central bore so as to form a seal receiving guide. The internal shoulder has a diameter that is larger than the diameter of the threaded body, and the sealing ring is disposed within the internal shoulder and adapted to receive the pin. A swage tool is also provided which mechanically forces the collar over the pin affixing a workpiece between the enlarged head and the collar with the sealing ring deforming and forming a fluid impermeable seal.

These and other aspects and advantages of the invention will become apparent from the following detailed description and the accompanying drawings, which illustrate by way of example the features of the invention.

BRIEF DESCRIPTION OF THE DRAWINGS

FIG. 5A is a schematic diagram showing the slicing off of a portion of a metal wire or bar stock to form a blank for the formation of the swaging collar, according to the present invention;

FIG. 5B is a schematic diagram illustrating the punching of the blank of FIG. 5A for form indentations in the blank;

FIG. 5C is a schematic diagram illustrating the forcing of the punched blank into a die by another punch to form the swaging collar according to the present invention;

FIG. 6A is a sectional view of a swaging collar and a sealing insert assembly showing the dimensions of the sealing insert in relation to the collar;

FIG. 6B is a sectional view of a swaging collar showing the dimensions of the collar;

FIG. 6C is a sectional view of an alternate embodiment of a blank for the formation of the swaging collar;

DETAILED DESCRIPTION OF THE PREFERRED EMBODIMENTS

Figure 1:
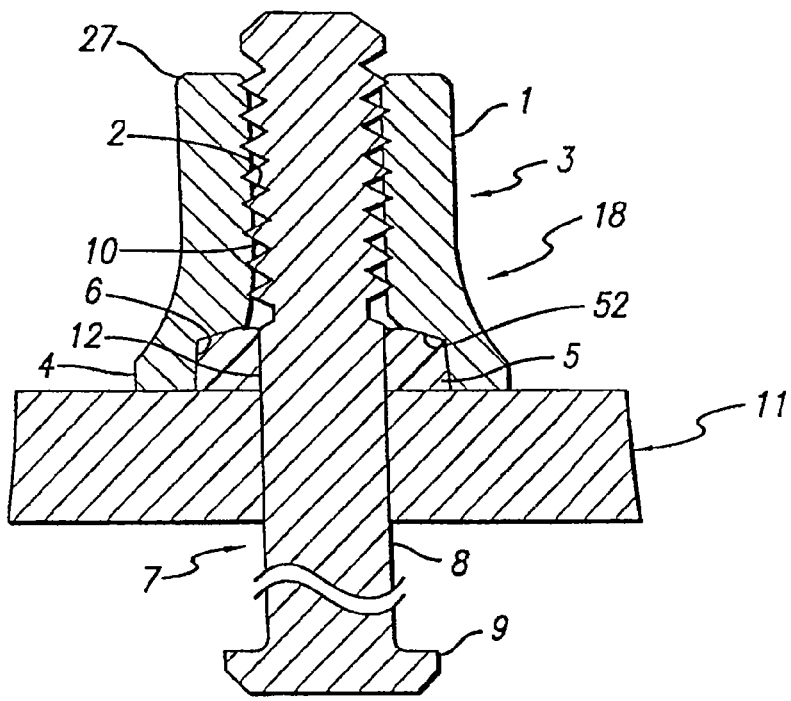
FIG. 1 is a sectional view of an assembly according to a first preferred embodiment, showing a portion of a pin with the swaging collar and internal sealing insert, according to the present invention.
Figure 2:
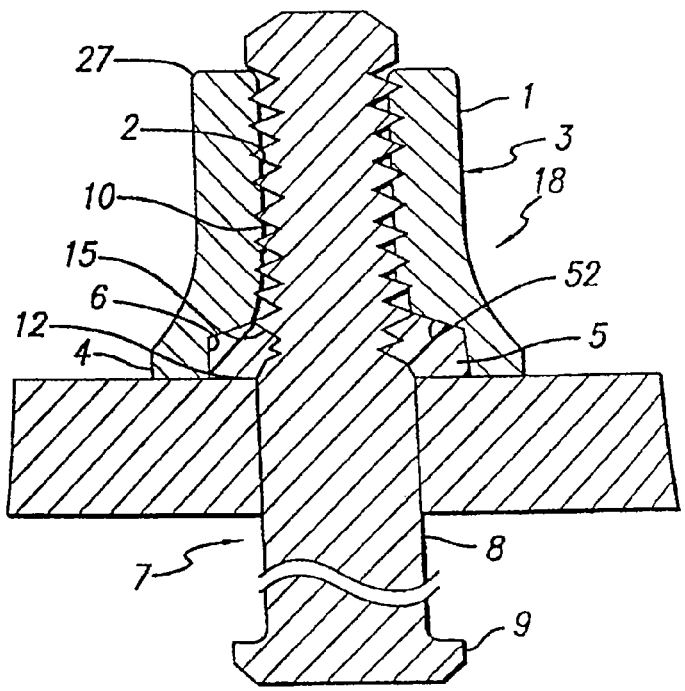
FIG. 2 is a sectional view of an assembly according to a second preferred embodiment, showing a portion of a pin with the swaging collar and internal sealing insert, according to the present invention.

The invention is depicted in cross-section in FIGS. 1 and 2. A preferred embodiment of the invention includes a hollow, generally cylindrical swage or swaging collar 3 with an internal sealing insert 5. The swaging collar includes a main body portion 1 with a main central bore 2, and a base portion 4 with an internal shoulder 6 formed in the main central bore so as to form a seal receiving guide. The internal shoulder has a diameter that is larger than the diameter of the main central bore. The base portion is preferably flared outward, and has an external diameter larger than the main body portion. The swage collar and seal are intended for use with an externally threaded fastener such as a pin 7 having a shaft 8 and an enlarged head 9, the pin being of the type used in fastening together components 11 in aerospace and other applications.

FIG. 1 depicts an assembly in which the relative dimensions of the pin 7, its threads or grooves 10, the swage or swaging collar 3, and the internal sealing insert 5 are such that the sealing insert interfaces with a relatively flat, unthreaded, ungrooved section 12 of the pin. FIG. 2 depicts an assembly in which the relative dimensions of the pin 7, its threads or grooves 10, the swaging collar 3, and the internal sealing insert 5 are such that the sealing insert interfaces with a threaded or grooved section 15 of the pin. Although either configuration may provide a useful fastener, the configuration of FIG. 2 provides greater grip and more secure sealing and is therefore regarded as preferable.

Figure 3:
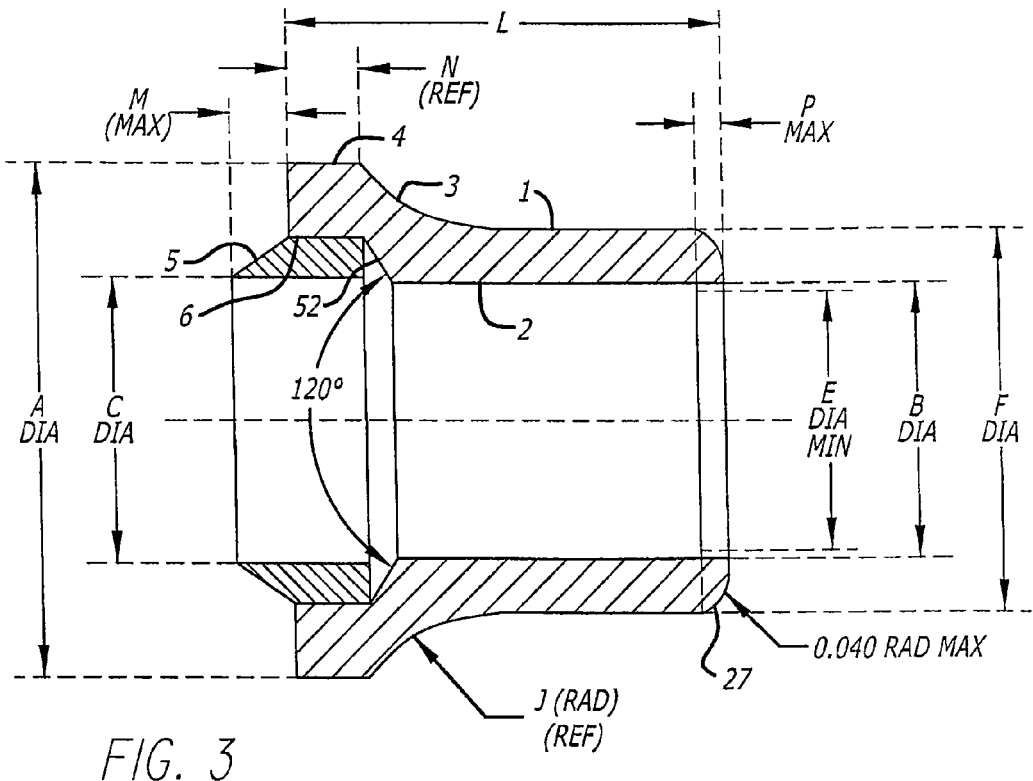
FIG. 3 is a sectional view of a swaging collar and a sealing insert in an uninstalled and unswaged condition apart from the pin, according to the present invention.

FIG. 3 depicts a swaging collar 3 and a sealing insert 5 in an uninstalled and unswaged condition apart from the pin (not shown). The collar is made of a suitable metal or another deformable material. Applicants have used aluminum (2024 Aluminum per QQ-A-430 or AMS-QQ-225/6), with heat treatment to a T4 or T42 condition per AMS2770 or AMS-H-6088), and commercially pure titanium (CP Titanium per ASTM B348 Grade 1, MIL-T-9047 CP-4). Applicants have used tetrafluoroethylene (TFE), such as TFE available under the brand name "TEFLON" from DuPont, per ASTM D1710 Type I, Grade 1 for the sealing insert. Other materials may be specified for either the collar 3 or the sealing insert 5 based on desired material properties well known to those skilled in the art. Exemplary dimensions for the swaging collar and sealing insert as depicted in FIG. 3 are presented in Table 1 below. In the tables below, "Dash No." indicates the nominal diameter of a mating pin in 1/32nds of an inch. The dimensions apply after the swaging collar and sealing insert are finished, and in FIG. 3, the diameter "C" is the inner diameter of the sealing insert.

TABLE 1

Dimensions of the swaging collar and sealing insert

| Dash No. | Pin Nom. Dia. | A Dia. | B Dia. | C Dia. Min. | E Dia. Min. | F Dia. | J RAD REF. | L | M Max. | N REF. | P Max |
|---|---|---|---|---|---|---|---|---|---|---|---|
| 6 | 3/16 | .384 | .193 | .188 | .185 | .298 | .150 | .284 | .055 | .060 | .016 |
|  |  | .364 | .189 |  |  | .294 |  | .264 |  |  |  |
| 8 | 1/4 | .477 | .253 | .248 | .245 | .391 | .150 | .349 | .070 | .060 | .016 |
|  |  | .457 | .249 |  |  | .387 |  | .329 |  |  |  |
| 10 | 5/16 | .581 | .316 | .310 | .310 | .484 | TBD | .448 | TBD | .060 | .031 |
|  |  | .561 | .312 |  |  | .480 |  | .428 |  |  |  |
| 12 | 3/8 | .712 | .378 | .372 | .372 | .588 | TBD | .493 | TBD | .060 | .031 |
|  |  | .692 | .374 |  |  | .584 |  | .473 |  |  |  |

The collar assembly 18, comprising the swaging collar 3 and the sealing insert 5 illustrated in FIG. 3, is installed using a swaging tool 20 depicted in FIGS. 4A-4E. Note that the dimensions given for the swaging tool depicted in FIG. 4A-4E are not consistent with use with the collar assembly 18 depicted in FIG. 3. As noted above, the collar assembly may have a wide range of dimensions. Each collar assembly will be installed with an appropriately sized matching swaging tool.

Figure 4A:
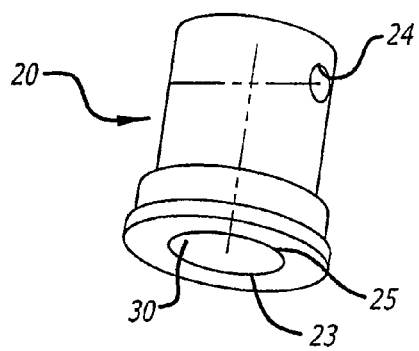
FIG. 4A is a perspective view of a swaging tool according to the present invention.
Figure 4B:
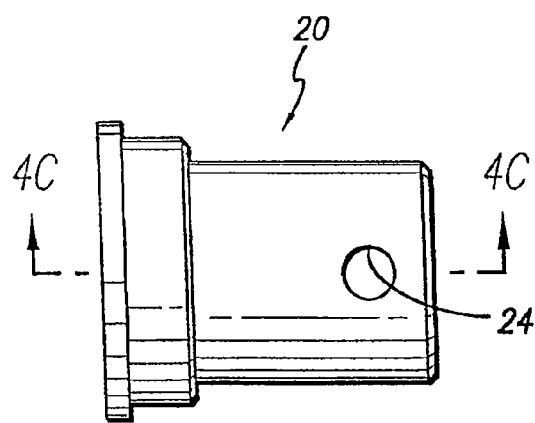
FIG. 4B is a plan view of the swaging tool of FIG. 4A.
Figure 4D:
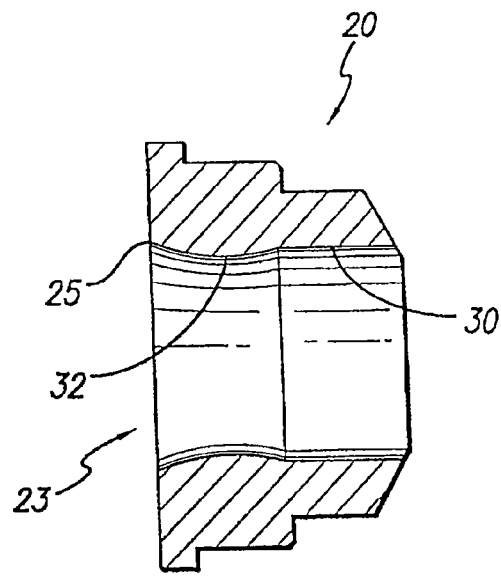
FIG. 4D is a sectional view of an alternate embodiment of a swaging tool according to the present invention.
Figure 4C:
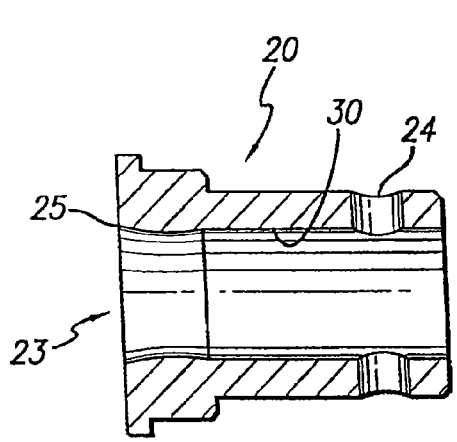
FIG. 4C is a sectional view of the swaging tool taken along line 4C-4C of FIG. 4B.
Figure 4E:
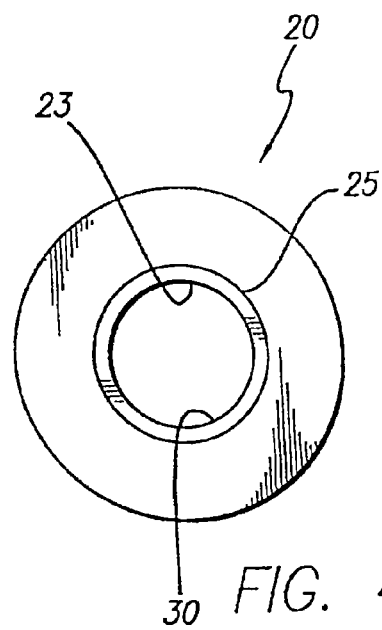
FIG. 4E is an end view of the swaging tool of FIGS. 4A and 4D.
Figure 7A:
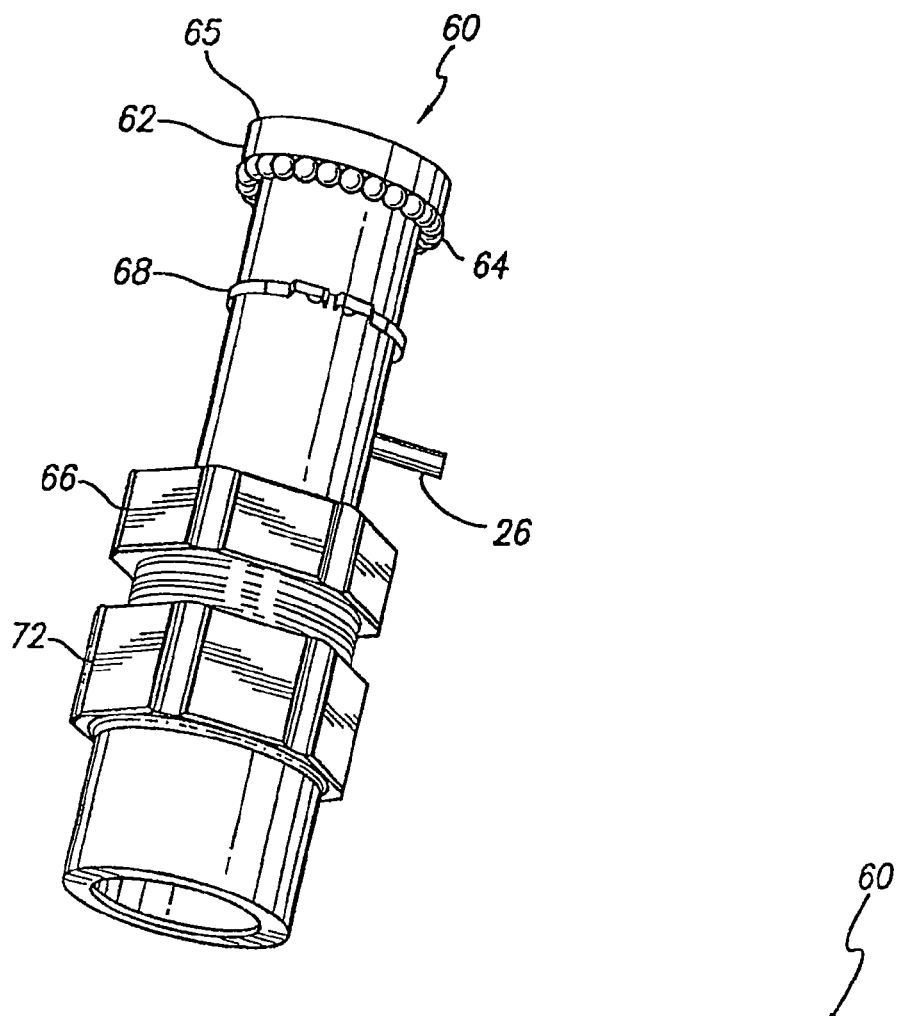
FIG. 7A is a partially exploded perspective view of a swaging tool assembly.
Figure 7B:
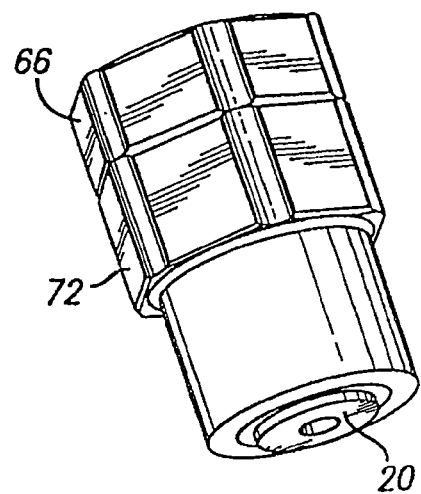
FIG. 7B is a perspective view of the assembled swaging tool of FIG. 7A.
Figure 7C:
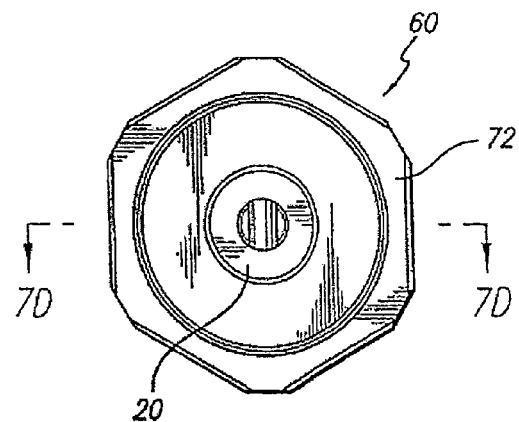
FIG. 7C is an end view of the assembled swaging tool of FIG. 7B.
Figure 7D:
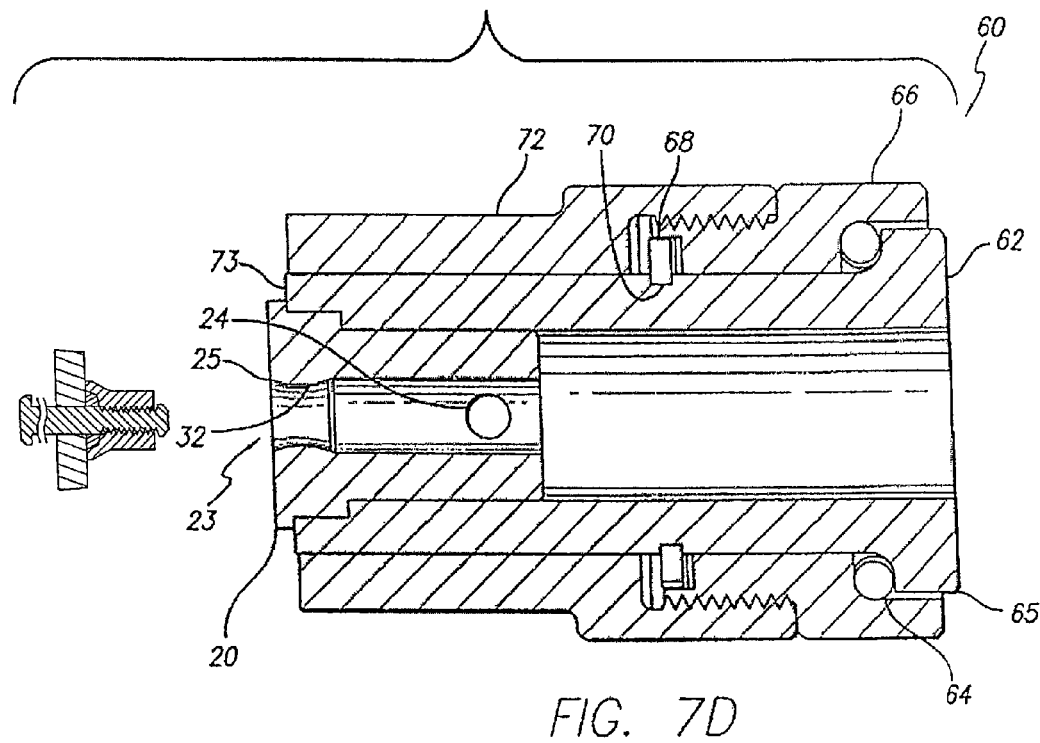
FIG. 7D is a sectional view of the swaging tool assembly taken along line 7D-7D of FIG. 7C.

Referring now especially to the cross-sectional detail view of FIG. 4C, the swaging tool 20 defines a collar entrance aperture 23 at one end. A transverse aperture 24 is provided through the body of the swaging tool for a dowel pin 26 shown in FIG. 7A. The tool is sized so that the entrance aperture has an inside diameter at its edge 25 that is slightly larger than the outside diameter of the swaging collar at the swaging collar's outside edge 27 (see, e.g. FIG. 3). The swaging tool may thus be fit over the swaging collar. The interior 30 of the swaging tool necks down smoothly to a relatively narrow point 32 on the swaging tool where the inside diameter is slightly smaller than the outside.

To swage the collar assembly 18 onto a threaded pin 7, the collar assembly is first fitted over the pin. The relative clearances between the pin and the sealing element and swaging collar are such that this may be done by an assembler by hand. The swaging tool 20 is then fit over the swaging collar and forced over the collar by a pneumatic impact tool or another appropriate means. Sufficient force is applied to the swaging collar to cause plastic deformation in the swaging collar so that the material of the swaging collar is force into the threads, thereby bringing the sealing element into tight sealing engagement with the pin as shown, e.g., in FIGS. 1 and 2.

A swaging collar assembly incorporating the invention has been found to be particularly useful in applications such as the joining of parts to aircraft fuel tanks. The combination of the threaded pin and metal swaging collar provide an inexpensive, easily installed, and secure fastener for joining the parts together, while the presence of the sealing element and its engagement with the pin prevent leakage of fuel or other fluids from the tank.

The swaging collar may be formed by conventional machining technique such as turning on a lathe. It has been found more economical, though, to form the swaging collar 3 by a technique illustrated in FIGS. 5A-5C. As indicated in FIG. 5A, the process begins with a length of metal wire or bar stock 35. A forming blank 38, having a volume equal to the final volume of the swaging collar, is sliced off the end of the stock.

Moving now to FIG. 5B, the forming blank 38 is punched at both ends to form twin indentations 40 in the cylindrical blank. Finally, as indicated in FIG. 5C, the punched blank 43 is forced into a die 45 by another punch 47. The punch goes entirely through the blank, forming an opening through it while forcing it against the sides of the die. A step 50 on the punch forms a well 52 (see FIG. 3), into which the sealing insert 5 is set before the collar assembly 18 is swaged onto the pin.

FIGS. 6A-B show views and dimensions of a collar and insert assembly with exemplary dimensions presented in Table 2 below. FIG. 6C shows an alternate embodiment of a preform blank 43' of the collar with the blank formed with an opening entirely through the blank, for dash no. sizes 10 and 12, with exemplary dimensions presented in Table 3 below. FIGS. 7A-D show views of a swaging tool assembly 60, which includes an anvil 62, ball bearings 64 at a top end 65 of the anvil, a nut 66 over the ball bearings at the top end of the anvil, and over a snap ring 68 located in a groove 70 at a mid-portion of the anvil. A sleeve 72 is provided over and threadedly connected to the nut, extending to the bottom end 73 of the anvil.

interior diameter that is larger than the diameter of the main central bore. The base portion is preferably flared outward, and has an external diameter larger than the main body portion. The swage collar and seal are intended for use with an externally threaded or grooved fastener such as a pin having a shaft and an enlarged head, the pin being of the type used in fastening together components in aerospace and other applications, as described above. The collar is made of a suitable metal or another deformable material, such as commercially pure titanium or aluminum, as described above. The sealing insert may also be made of tetrafluoroethylene (TFE), such as TFE available under the brand name "TEFLON" from DuPont, as described above. Other materials may be specified for either the collar 83 or the sealing insert 85 based on desired material properties well known to those skilled in the art. The sealing insert includes an annular rounded exterior flange 87, that interfits into a corresponding rounded channel or groove 89 in the internal shoulder of the main central bore, in order to lock the sealing insert into place within the internal shoulder portion of the main central bore. The internal shoulder of the main central bore may also include an intermediate stepped portion 90 with an interior diameter that is less than the interior diameter of the internal shoulder 86 and greater than the diameter of the main central bore, in order to further lock the sealing insert into place in the internal shoulder of the main central bore.

It will be apparent from the foregoing that while particular forms of the invention have been illustrated and described, various modifications can be made without departing from the spirit and scope of the invention. Accordingly, it is not intended that the invention be limited, except as by the appended claims.

TABLE 2

Dimensions of the swaging collar and sealing insert

| Dash No. | A Dia. | B Dia. | E Dia. Min | F Dia. | H Dia. | J Rad | L | N | P Max | X | AB Dia. Min. | AD |
|---|---|---|---|---|---|---|---|---|---|---|---|---|
| 5 | .346 .326 | † | .160 | .260 .256 | .167 .163 | † | .266 .246 | .065 .055 | .016 | .060 .055 | .164 | † |
| 6 | .384 .364 | † | .185 | .298 .294 | .193 .189 | † | .284 .264 | .065 .055 | .016 | .060 .055 | .188 | † |
| 8 | .477 .457 | .325 .323 | .245 | .391 .387 | .253 .249 | .160 .150 | .349 .329 | .060 .055 | .016 | .060 .055 | .248 | .055 .040 |
| 10 | .581 .561 | † | .310 | .484 .480 | .316 .312 | † | .448 .428 | .060 .055 | .031 | .060 .055 | .310 | † |
| 12 | .712 .692 | † | .372 | .588 .584 | .378 .374 | † | .493 .473 | .060 .055 | .031 | .060 .055 | .372 | † |

(†- To be determined)

TABLE 3

Dimensions of the preform blank

| Dash No. | BA Dia. | BH Dia. | BL | BR Rad. |
|---|---|---|---|---|
| 10 | .569 .567 | .320 .318 | TBD | .040 .030 |
| 12 | .700 .698 | .382 .380 | TBD | .040 .030 |

Figure 8:
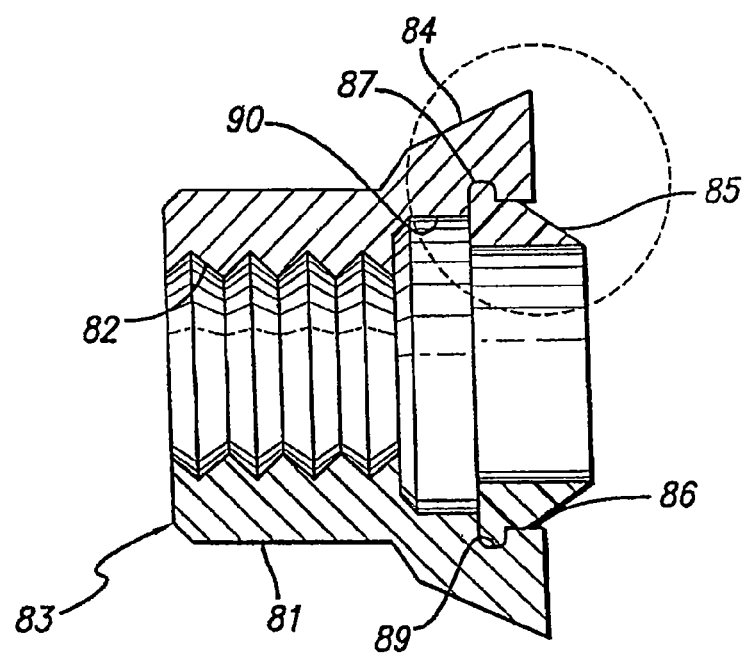
FIG. 8 is a sectional view of an alternate embodiment of a swaging collar and a sealing insert in an uninstalled and unswaged condition apart from the pin, according to the present invention.
Figure 9:
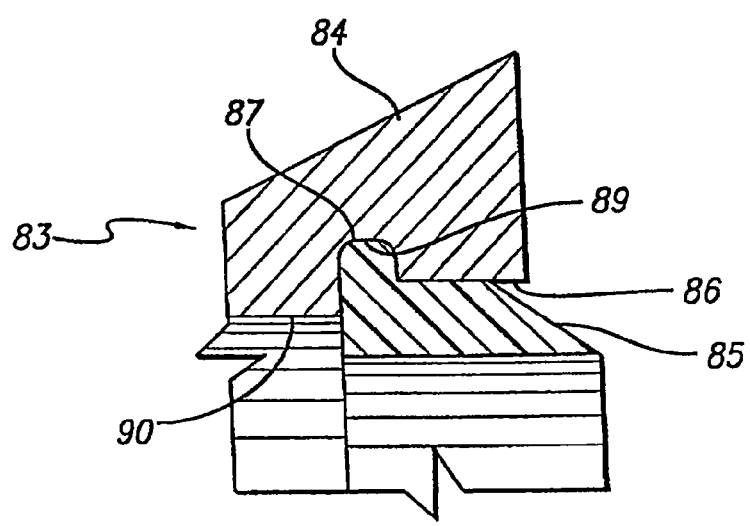
FIG. 9 is a detail view of the circled portion of FIG. 8.

FIGS. 8 and 9 depict an alternate embodiment of a swaging collar 83 and a sealing insert or sealing ring 85 in an uninstalled and unswaged condition apart from the pin (not shown). The swaging collar includes a main body portion 81 with a main central bore 82, and a base portion 84 with an internal shoulder 86 formed in the main central bore so as to form a seal receiving guide. The internal shoulder has an

What is claimed is:

1. A swaging tool assembly for installing a sealing fastener on a workpiece, said sealing fastener including a pin and a swage collar, the pin having a shaft, and the swage collar being received over the shaft, the swaging tool assembly comprising:
    a generally tubular anvil having a top end and a bottom end; and
    a swage tool having a top end and a bottom end, said swage tool being received in and engaged with the bottom end of said anvil, and said swage tool having an entrance aperture at the bottom end of said swage tool for engagement with a swage collar engaged over a sealing fastener on a workpiece, said swage tool including an outer nut and an outer sleeve, said outer nut being rotatably engaged over said anvil adjacent to the top end of the anvil, said outer sleeve being disposed over said anvil and extending to the bottom end of said anvil, and said outer sleeve being threadably engaged over said outer nut such that said outer sleeve is extendable toward said bottom end of said swaging tool for disengagement of the swage collar from said entrance aperture of said swage tool.

2. The swaging tool assembly of claim 1, wherein said entrance aperture of said swage tool includes an interior bore which necks down smoothly to a relatively narrow convex rounded surface for engaging the swage collar.

3. The swaging tool assembly of claim 1, wherein said anvil includes an outer surface defining a groove, and said outer nut is rotatably retained over said anvil adjacent said top end of said anvil by a snap ring disposed in said groove on said outer surface of said anvil.

4. The swaging tool assembly of claim 3, further comprising a plurality of ball bearings disposed between said outer nut and said anvil adjacent to the top end of said anvil and adjacent to a top end of said outer nut.

\* \* \* \* \*